(12) United States Patent
Nelson et al.

(10) Patent No.: US 10,910,841 B2
(45) Date of Patent: Feb. 2, 2021

(54) METHOD AND SYSTEM FOR POWER GRID VOLTAGE REGULATION BY DISTRIBUTED ENERGY RESOURCES

(71) Applicant: Siemens Gamesa Renewable Energy A/S, Brande (DK)

(72) Inventors: Robert J. Nelson, Orlando, FL (US); Najlae Yazghi, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 46 days.

(21) Appl. No.: 15/747,588

(22) PCT Filed: Nov. 10, 2015

(86) PCT No.: PCT/US2015/059838
§ 371 (c)(1),
(2) Date: Jan. 25, 2018

(87) PCT Pub. No.: WO2017/082867
PCT Pub. Date: May 18, 2017

(65) Prior Publication Data
US 2018/0219382 A1    Aug. 2, 2018

(51) Int. Cl.
  *H02J 3/18*   (2006.01)
  *H02J 3/38*   (2006.01)
  *G05F 1/44*   (2006.01)

(52) U.S. Cl.
  CPC .............. *H02J 3/386* (2013.01); *G05F 1/44* (2013.01); *H02J 3/18* (2013.01); *Y02E 10/76* (2013.01)

(58) Field of Classification Search
  USPC ........................................................ 307/52
  See application file for complete search history.

(56) References Cited

U.S. PATENT DOCUMENTS 7,119,452 B2   10/2006   Larsen
7,166,928 B2    1/2007   Larsen
(Continued)

FOREIGN PATENT DOCUMENTS

CN    104521090 A    4/2015
CN    104682437 A    6/2015
(Continued)

OTHER PUBLICATIONS

Strunz Kai et al: "DC Microgrid for Wind and Solar Power Integration", IEEE Journal of Emerging and Selected Topics in Power Electronics, IEEE, Piscataway, NJ, USA, vol. 2, No. 1, Mar. 31, 2014 (Mar. 31, 2014), pp. 115-126, XP011538387, / Mar. 31, 2014.

(Continued)

*Primary Examiner* — Rexford N Barnie
*Assistant Examiner* — Xuan Ly
(74) *Attorney, Agent, or Firm* — Wolter Van Dyke Davis, PLLC

(57) ABSTRACT

A system and method for regulating a voltage at a point of common coupling (35) (PCC) of a distributed energy resource farm (1) connected to an electrical power grid (37). The distributed energy resource farm includes a plurality of connected distributed energy resources (2, 3) each supplying a terminal voltage. The system includes a component (50) for measuring a PCC voltage at the PCC, and another component (39, 41) for determining a first value based on a relationship between a scheduled voltage at the PCC and the (Continued)

measured PCC voltage relative to a dead band voltage region (66). A further component (39, 41) regulates the voltage at the point of common coupling by controlling the terminal voltage of each one of the plurality of distributed energy resources in response to the relationship between the scheduled voltage and the measured voltage at the PCC.

16 Claims, 3 Drawing Sheets

(56) References Cited

U.S. PATENT DOCUMENTS

| | | | |
|---|---|---|---|
| 7,224,081 | B2 | 5/2007 | Larsen |
| 7,275,002 | B2* | 9/2007 | Huang ............... H02J 3/38 363/56.1 |
| 7,808,126 | B2 | 10/2010 | Stiesdal |
| 7,839,024 | B2 | 11/2010 | Cardinal et al. |
| 8,373,291 | B2 | 2/2013 | Zeumer et al. |
| 10,174,742 | B2 | 1/2019 | Diedrichs |
| 2005/0046196 | A1 | 3/2005 | Larsen |
| 2006/0012181 | A1 | 1/2006 | Larsen |
| 2006/0255594 | A1 | 11/2006 | Larsen |
| 2009/0096211 | A1 | 4/2009 | Stiesdal |
| 2010/0025994 | A1 | 2/2010 | Cardinal et al. |
| 2010/0312409 | A1 | 12/2010 | Zeumer et al. |
| 2012/0139241 | A1* | 6/2012 | Haj-Maharsi ...... F03D 7/0224 290/44 |
| 2014/0265596 | A1* | 9/2014 | Yuan ................. H02J 3/382 307/69 |
| 2015/0123475 | A1* | 5/2015 | Premm ............... H02J 3/381 307/24 |
| 2018/0073486 | A1* | 3/2018 | Zhang ................ H02P 9/04 |

FOREIGN PATENT DOCUMENTS

| | | |
|---|---|---|
| EP | 1906505 A1 | 4/2008 |
| EP | 2084801 B1 | 5/2010 |
| KR | 20140039389 A | 4/2014 |
| WO | 2008049556 A1 | 5/2008 |
| WO | 2014013010 A2 | 1/2014 |

OTHER PUBLICATIONS

Laaksonen H. et al; "Voltage and Frequency Control of Inverter Based Weak LV Network Microgrid"; Future Power Systems, 2005 Interantional Conference on Amsterdam, the Neterhlands Nov. 16-18, 2005, Piscataway, NJ, IEEE; pp. 1-6; ISBN: 978-90-78205-02-9; XP010897518 / Nov. 16, 2005.

Johan Morren et al: "Contribution of DG units to voltage control: Active and reactive power limitations", Power Tech, 2005 IEEE Russia, IEEE, Piscataway, NJ, USA, Jun. 27, 2005 (Jun. 27, 2005), pp. 1-7, XP031254700 / Jun. 27, 2005.

Vandoorn Tine L et al: "Microgrids: Hierarchical Control and an Overview of the Control and Reserve Management Strategies", IEEE Industrial Electronics Magazine, IEEE, US, vol. 7, No. 4, Dec. 31, 2013 (Dec. 31, 2013), pp. 42-55, XP011533507 / Dec. 31, 2013.

\* cited by examiner

METHOD AND SYSTEM FOR POWER GRID VOLTAGE REGULATION BY DISTRIBUTED ENERGY RESOURCES

FIELD OF THE INVENTION

This invention relates generally to the field of distributed energy resources (e.g., wind turbine generators) and more specifically to a method and system for regulating the voltage on a power grid by action of distributed energy resources.

BACKGROUND OF THE INVENTION

Distributed energy resources (DER) are relatively small power sources that are connected directly to power distribution systems. Typically, multiple proximate DERs are aggregated and connected to the power grid at a common point to supply power necessary to meet load demands. DERs, which advantageously produce electricity close to end-user loads, may include modular and renewable-energy generators such as photovoltaic systems, wind turbine generators, trash burners, diesel generators, and small geothermal systems.

In contrast to the use of a few large-scale generating stations located far from load centers, the approach used in traditional electric power systems, distributed generation systems employ numerous, but small DERs that provide power proximate loads with minimal reliance on distribution and transmission systems. A plurality of proximate DERs may be connected together and connected to the grid at a point of common coupling (PCC) and may be collectively referred to as a park or farm.

DERs provide power capacities that range from a fraction of a kilowatt (kW) to about 10 megawatts (MW), but could be extended to 100 MW. Large utility-scale generating plants have capacities that can exceed 1,000 MW.

In a wind turbine generator (WTG), one example of a DER, wind kinetic energy is converted to electrical energy. The wind turbine generator comprises rotor blades for converting wind energy to rotational energy for driving a shaft connected to a gearbox. The gearbox converts low speed shaft rotation to high speed rotation as required for driving a generator that generates electricity. Certain WTG designs lack the gearbox and instead the generator is driven directly from the shaft.

The wind turbine generator also includes various control components (for example to change a blade pitch), a structural support, such as a tower, and a rotor yawing system for orienting the rotor plane perpendicular to the oncoming wind.

A fixed-speed wind turbine, i.e., the gearbox output shaft rotates at a fixed speed, is a simple, reliable, low-cost, proven WTG. But its disadvantages include uncontrollable reactive power consumption (as required to generate a rotating flux in the generator stator), mechanical stresses, limited control of power quality and relatively inefficient operation. In fact, wind speed fluctuations result in mechanical torque fluctuations that can result in fluctuations in the electrical power on the grid.

Variable speed WTG operation can be achieved only by decoupling the electrical grid frequency and the mechanical rotor frequency. The rotational blade speed of a variable speed WTG can be controlled to continuously adapt to the wind speed and to maximize the power generated by the wind turbine. Since an electric generator is usually coupled to a variable speed WTG rotor through a fixed-ratio gear transmission, the electrical power produced by the generator has a variable frequency.

Decoupling the grid frequency from the rotor mechanical frequency typically requires use of an electronic power converter. Generally, the power converter imparts characteristics to the generated electricity that are required to match electricity flowing on the grid, including active power, voltage magnitude and frequency. Thus the converter converts the variable electrical frequency and voltage output from the generator stator to the grid frequency and grid voltage.

Although variable speed WTGs are advantageous from the perspective of increased energy conversion and reduced mechanical stresses, the electrical generation system is more complicated than that of a constant speed wind turbine due primarily to the need for the power converter.

Both fixed speed and variable speed WTGs are designed to operate in parallel with a synchronous generator, with both supplying power to the grid. The output power of the WTG's synchronizes to the grid frequency to produce a constant frequency electrical output and to contribute real and reactive power (referred to as dynamic power factor control) as commanded from a centralized power system controller. Dynamic power factor control may be accomplished as WTGs switch a capacitor bank on or off the electrical grid or by action of a WTG controller that controls an angle between the generated current and voltage (i.e., controlling the power factor of the generated electricity). In essence, dynamic power factor control establishes a division between real and reactive power generation, as the sine of the power factor angle represents reactive power and the cosine of the power factor angle represents real power.

Implementing dynamic power factor control in a wind park (i.e., a plurality of proximate and connected WTGs) may also require consideration of the location of each WTG within the park as each WTG is connected to the point of common coupling over lines that exhibit different resistance, reactance and capacitance values.

In the past, DERs (such as WTGs) were not permitted to regulate voltage at the point of common coupling according to standards promulgated by the Institute of Electrical and Electronics Engineers (IEEE) and various country electrical grid codes. However, today these standards and codes are undergoing revision to require voltage regulation by the DERs.

The preferred voltage regulation technique under the revised standards and codes is referred to as voltage regulation with reactive power droop or volt-var control. This technique provides an amount of reactive power based upon the difference between the voltage at the point of common coupling (PCC) to the distribution system and the scheduled voltage at the PCC (also referred to as a desired or reference voltage at the PCC). Reactive droop concepts have also been applied to synchronous generator applications to ensure reactive power sharing between the generators. This technique has been used for many years for large generator applications.

BRIEF DESCRIPTION OF THE DRAWINGS

The invention is explained in the following description in view of the drawings that show.

DETAILED DESCRIPTION OF THE INVENTION

Figure 1:
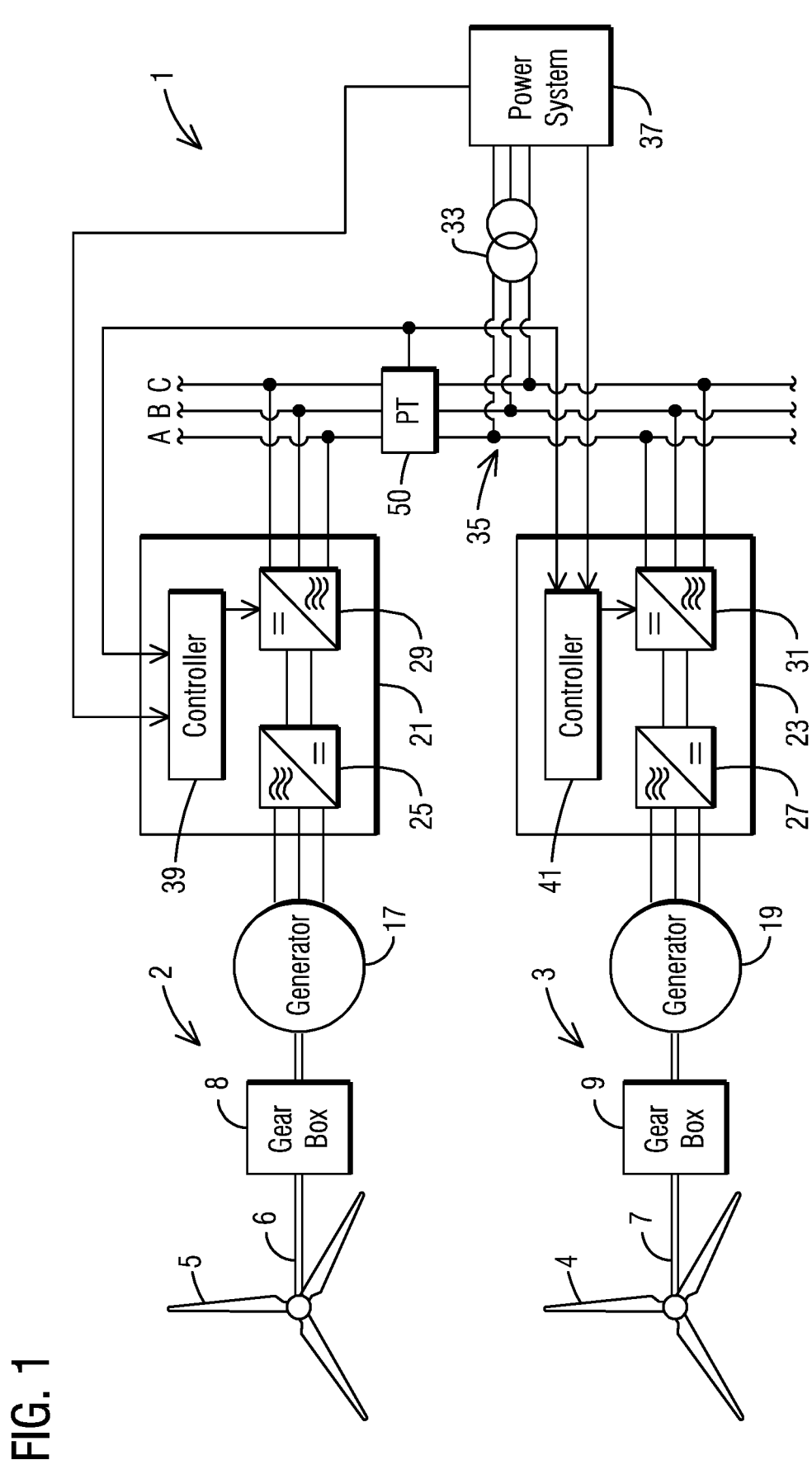
FIG. 1 illustrates a wind turbine park to which the teachings of the present invention can be applied.

The inventors have recognized that despite the long history of its successful application to large generators, there are disadvantages associated with the reactive power droop technique. The DER resources are small generating units. A typical application DER may have a capacity of 1 MW or less. Also, these resources may be intermingled with loads and with reactive resources, so it may not even be possible to provide the required amount of reactive power. For example, if the DER is co-located with switched capacitors and the capacitors are on-line, it may be inappropriate for the DER to provide reactive power solely because the PCC voltage is low. Indeed, such an action may cause an over-voltage and subsequent trip of the DER.

Also, the present inventors have recognized that DER operators are typically not well-trained in power system operations and the concept of reactive power may be confusing to DER operators. For example, reactive power that boosts system voltage is considered lagging when referring to a generator (i.e., generator convention), but is considered leading when referenced to a load (i.e., load convention). It is not uncommon for DER operators to misunderstand reactive power and often supply negative reactive power when positive reactive power is required, and vice versa. The conventions for reactive power are confusing even to electrical engineers, since the convention used for loads is the reverse of that used for generators. Further, some equipment, such as a converter, is considered a load in some situations and a generation source in others.

Additionally, reactive power control requires a continuous closed-loop control system. After a change in system voltage, the DER must measure the reactive power it supplies (requiring input from both current transformers and voltage transformers, both of which must provide metering accuracy measurements) and adjust the reactive power by an appropriate amount. The reactive power is then measured again according to a closed-loop control system. Depending on the response of other resources, reactive power control equipment, etc., determining suitable response times and reactive power ramp rates can become excessively complex, perhaps unjustifiably so for very small resources.

The present invention overcomes the limitations of the prior art scheme with a method and system for regulating voltage at the PCC by droop control that relies only on an open loop voltage control, i.e., a closed-loop feedback loop is not required. According to this scheme, the DER voltage is controlled to vary inversely with the PCC voltage (where the relationship between the voltages can be linear, stepped, or embodying another mathematical or table-based or schedule-based relationship), without consideration of the reactive power.

The invention controls the DER terminal voltage in a manner consistent with the requirements of the system without imposing difficult reactive power control or performance requirements on DERs or on the DER operator. The DER terminal voltage is regulated based only on a voltage at the point of common coupling as measured by a potential transformer (PT).

According to one embodiment, a table or schedule of DER output voltages is determined for each one of one or more DERs that are connected to the PCC. The DER output or terminal voltage schedule is based on the PCC voltage. Alternatively, in lieu of a schedule comprising fixed-values, the output voltage at the one or more DERs can be controlled according to an equation (e.g., a functional relationship) between the PCC voltage and the one or more DER voltages. In the latter alternative, the PCC voltage value is plugged into the equation to determine the DER terminal voltage.

This technique of controlling the DER output voltage is much simpler, much less confusing, and much easier for DER owners to understand and to implement than concepts related to adding/subtracting positive/negative reactive power. It is also easier for electric power system owners to specify a desired PCC voltage than to require generation or absorption of reactive power by the DERs. Finally, the inventive technique is as effective as the prior art reactive droop techniques.

FIG. 1 illustrates a wind turbine generator farm or park 1 including variable speed wind turbine generators 2, 3. The WTGs 2, 3 generate electrical power that is supplied to a power system or utility grid 37 via a point of common coupling (PCC) 35. Since the WTGs 2, 3 are variable speed wind turbines, the rotational speed of their respective generator rotors is variable depending on wind conditions. The electrical lines connecting the WTGs 2, 3 to the PCC 35 may be of considerable and of different respective lengths and may therefore have resistance, inductance and capacitance values that are not negligible.

Each WTG 2, 3 includes turbine blades 4, 5 attached to a rotor shaft 6, 7 for transmitting the torque of the wind-driven blades 4, 5 to a fixed gear-ratio gearbox 8, 9. An output shaft of the gearbox 8, 9 drives an AC generator 17, 19 for transforming the mechanical power provided by rotation of the rotor shaft 6, 7 to electrical power. The gearbox 8, 9 provides a transmission ratio that allows the gearbox output shaft to turn at a different speed than the rotor shaft 6, 7. Preferably the gearbox output shaft turns at a speed that optimizes the electricity generated by the AC generators 17 and 19.

The AC generators 17, 19 can comprises either synchronous generators or asynchronous (induction) generators and further each comprises power electronics components. Generally, in a synchronous generator, a generator rotor rotates at the same rotational frequency as the rotating magnetic field produced by a generator stator (or with an integer relationship to the frequency of the rotating magnetic field, where that integer relationship depends on the number of rotor pole pairs).

In contrast thereto, in an asynchronous generator (induction generator), the rotational frequency of the stator's magnetic field (conventionally 60 Hz when the stator magnetizing current is supplied from the electrical grid) is independent from the rotational frequency of the rotor. The difference in rotational frequency of the rotor and the rotational frequency of the stator's magnetic field is numerically described by a slip value.

If the generators 17, 19 of FIG. 1 comprise synchronous generators, the frequency of the output power therefrom depends on wind velocity. The frequency of the generator output must therefore be converted to the frequency of the electrical grid to which the generators 17, 19 supply electricity through the PCC 35.

The frequency conversion process is accomplished by action of power electronics frequency converters 21, 23. Each frequency converter converts the frequency of the electrical power delivered by generators 17, 19 into electrical power having a fixed frequency corresponding to the frequency of the power system 37. Each of the frequency converters 21, 23 comprises a respective generator-side converter (rectifier) 25, 27 for converting the AC current produced by the generator 17, 19 into a DC current. A network-side converter (an inverter) 29, 31 converts the DC current back to an AC current of a desired voltage at the frequency of the power system 37. The AC output of the network-side converter 29, 31 is supplied to the power system 37 via the PCC 35 and a transformer 33. The network-side converters 29, 31 are controlled respectively by controllers 39, 41, which are described further below in conjunction with the teachings of the present invention, as certain aspects of the invention are implemented in the controllers 39, 41. The terms "output voltage" and "terminal voltage" are used with their common meaning herein to refer to the voltage at the output of the generator, typically measured locally at output terminals of the generator and typically downstream of frequency conversion equipment.

A potential transformer (PT) 50, or other appropriate device as may be known in the art, measures the voltage on each of the phase conductors A, B, and C at the PCC 35 and supplies the measured PCC voltage value to the controllers 39, 41 for use in controlling the output voltage from each WTG 2,3.

According to the invention, the WTG (i.e., the DER) output voltage is adjusted, as controlled by the controllers 39, 41, relative to the PCC voltage as measured by the PT 50. Alternatively, one or more other variables (e.g. current and impedance) may be measured at the PCC such that the voltage at the PCC can be derived.

Figure 2:
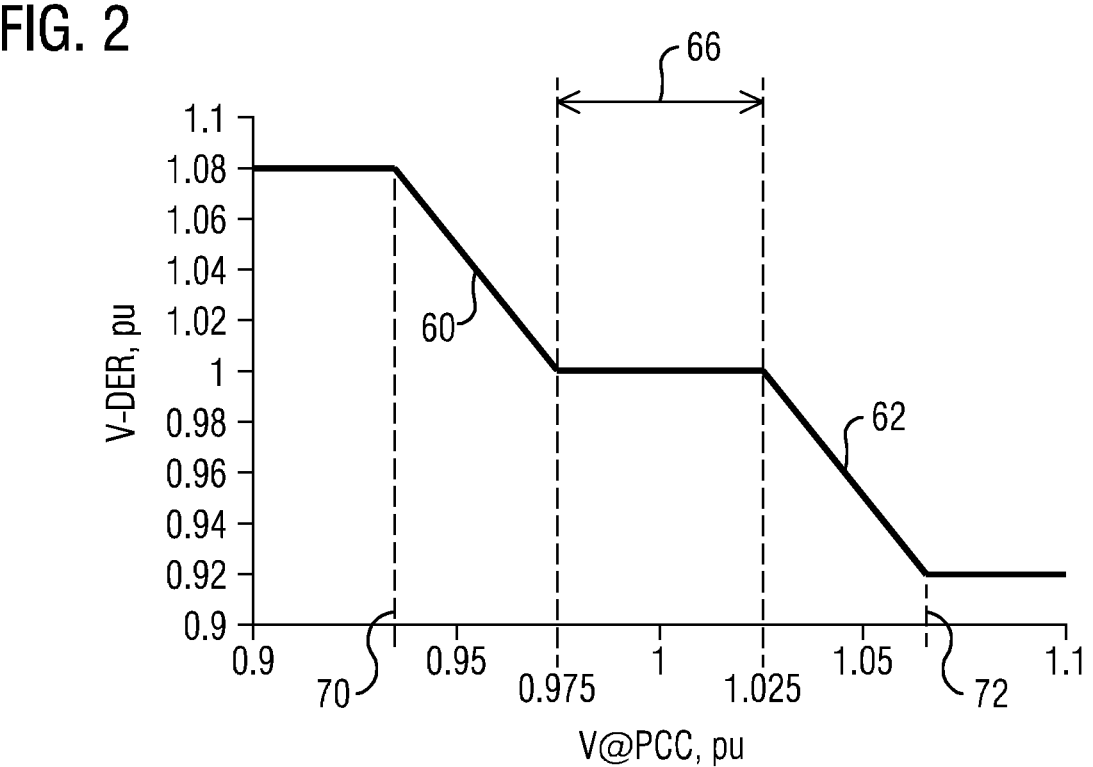
FIG. 2 illustrates an exemplary functional relationship between the point of common coupling voltage on a pu (per unit) basis and DER voltage, also on a pu basis.

FIG. 2 is an example of one function that relates the measured voltage (whether measured directly or derived) at the PCC on a per unit (pu) basis (on the X-axis) to the output voltage of a DER on a per unit (pu) basis (on the Y-axis).

Both the X-axis and Y-axis pu values in FIG. 2 represent a ratio of a measured voltage (i.e., as measured at the PCC (X-axis) and at the output of the DER (Y-axis)) and a nominal voltage. In this case the measured voltage on the X axis is divided by the scheduled or desired voltage value at the PCC.

A sloping line 60 represents a linear functional relationship in a region of the graph along the X-axis where the measured PCC voltage pu is less than the scheduled PCC voltage pu. Thus the ratio is less than one in this region, which is referred to as the low voltage region.

A sloping line 62 represents a linear functional relationship in a high voltage region of the graph along the X-axis where the measured PCC voltage is greater than the scheduled PCC voltage.

A dead band 66 between the low and high voltage regions indicates an acceptable range for the ratio of the measured PCC voltage and the scheduled PCC voltage. As the Y-axis of the graph indicates within the dead band 66, it is not necessary for the DER to change its output voltage when the PCC voltage is within the dead band 66. However, the indicated dead band end points of 0.975 pu and 1.025 pu are merely exemplary, and no dead band may be used in some embodiments.

It is also not necessary that the relationship between the DER output voltage and the PCC voltage be a fixed linear slope for either or both the high voltage case and the low voltage case. For example, the response can also be a step function, i.e. a maximum voltage response if the PCC voltage drops below 0.975 and minimum voltage response if the PCC voltage goes above 1.025.

The relationship could also be described by a mathematical relationship, e.g., Vder=min (1.1, 1+√(0.975/Vpcc−1)) for Vpcc≤0.975, and Vder=max (0.9, 1−√(Vpcc/1.025−1)) for Vpcc≥1.025, or any other mathematical relationship. This is just an example, of course. It is expected that most applications will employ a linear relationship.

It is also not required that high and low voltage regions be symmetrical about the dead band region 66. Some embodiments may display a high-side biased or a low side biased response, that is, a different response for a high voltage case than for a low voltage case. It may be desirable, for example, to have a more robust response to an under-voltage situation (which is generally considered to be an emergency situation) than for over-voltage case (which is seldom regarded as an emergency situation). In one embodiment, the slope of a plot of the relationship between measured PCC voltage and DER terminal voltage may have a steeper slope in the under-voltage region than in the over-voltage region, or a look-up table used to determine the DER terminal voltage.

It is also not required that the end points 70 and 72 be symmetrical about the dead band 66. The end points 70 and 72 may represent acceptable voltage limits of the electrical power system and the dead band represents the scheduled PCC voltage range for which the DER maintains a constant terminal voltage. This constant terminal voltage may be higher or lower than the nominal terminal voltage of the DER. For example, the DER may have a nominal terminal voltage of 480V, but the DER may be controlled to hold a voltage of 475V (or even 500V) for a PCC voltage within +/−2.5% of scheduled DER terminal voltage.

The operator of the DER and the grid can determine the preferable relationship between the DER output voltage and the PCC voltage that will allow acceptable regulation of the grid voltage. Any functional or tabular relationship between these two parameters is considered within the scope of the present invention.

Further, the functional relationship between the DER output voltage and the PCC voltage may be site-specific, and further may be specific for each DER or each DER type within a DER park. In the latter situation, since each DER is spaced at a different distance from the PCC the reactance of the connecting conductor will likely be different for each DER. This factor may suggest a different output voltage for each DER.

In lieu of the functional relationship embodied in the graph of FIG. 2, in a table-based or schedule-based embodiment the DER output or terminal voltage is controlled by reference to a look-up table that relates the two quantities. The measured voltage serves as an index to the schedule or table and the schedule or table sets forth an output voltage for the indexed measured voltage.

Alternatively, curves such as the one illustrated in FIG. 2, can developed and implemented system-wide, by DER type, and/or by individual DER.

As related to wind turbine generators, for a relatively small wind park, in one embodiment all WTGs in the park may output the same voltage. Alternatively, the voltage may be adjusted to reflect the location of the WTG within the park. WTGs remote from the PCC see a different impedance value than those close to the PCC, so each may require a different output or terminal voltage for achieving the same voltage at the PCC.

Figure 3:
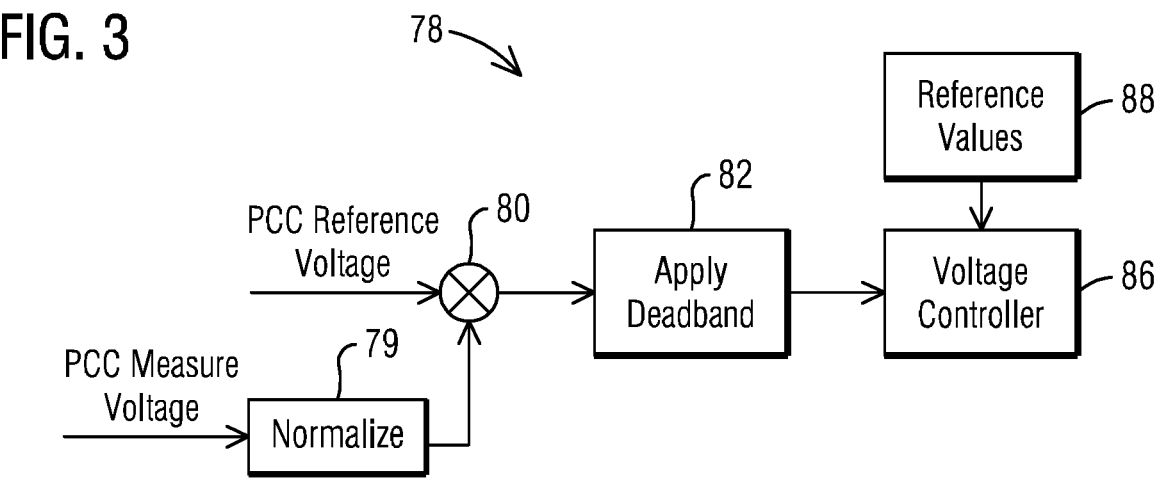
FIG. 3 illustrates an exemplary open loop control system for use with the present invention.

FIG. 3 illustrates a block diagram of a voltage regulation circuit 78 for implementing the teachings of an embodiment of the present invention. The voltage regulation circuit 78 may be one element of the controller 39, 41 of FIG. 1 or may be embodied in a separate component or components as may be known in the art.

The PCC measured voltage (from the potential transformer 50 of FIG. 1) is normalized (e.g., converted to a pu value format) in a component 79.

A multiplier 80 receives a PCC reference voltage and the PCC measured voltage, and calculates a ratio of these two values. That ratio is represented by values on the X-axis of FIG. 2.

The ratio value is input to a component 82 that applies the dead band values and determines whether the ratio value is within or outside the dead band. With reference again to FIG. 2, the dead band extends from a PCC voltage pu of 0.975 to a value of 1.025 V pu. As described above, a control signal for changing the DER output voltage is not generated by the component 82 if the ratio is within the dead band.

If the ratio value is outside the dead band (for example, the X-axis ratio value is 0.95) the component 82 produces a signal input to a voltage controller 86 where that signal includes the determined ratio. Reference values are also input to the controller 86 from a component 88 for use in calculating the DER output voltage (as a raw voltage value or as a voltage pu value). Essentially, the controller 86 implements the equations (or alternatively a schedule) defining the graph of FIG. 2, or any other relationship between the voltage at the PCC and the output voltage of the DER. A single device, such as a controller, may perform the functions of the components 79, 82 and/or 86 in some embodiments. The output from the voltage controller 86 is a control signal input to the network-side converters 29, 31 or other device controlling DER voltage in other embodiments.

According to one embodiment, the hardware/software implementing the invention may comprise a default DER voltage value that is used in certain situations. For example if communications from the PCC to the DER is lost or the potential transformer (PT) malfunctions, the default value is used. Examples of a possible default voltage value may include: the most recent value prior to the loss of communications or malfunction, a nominal constant value such as 480 V for a nominal 480 V DER or even 500 V for a nominal 480 V DER.

A software algorithm for implementing the teachings of the present invention maps a measured PCC voltage to a DER voltage. The mapping can be accomplished, for example, with a table, an equation, or a graph such as FIG. 2.

Figure 4:
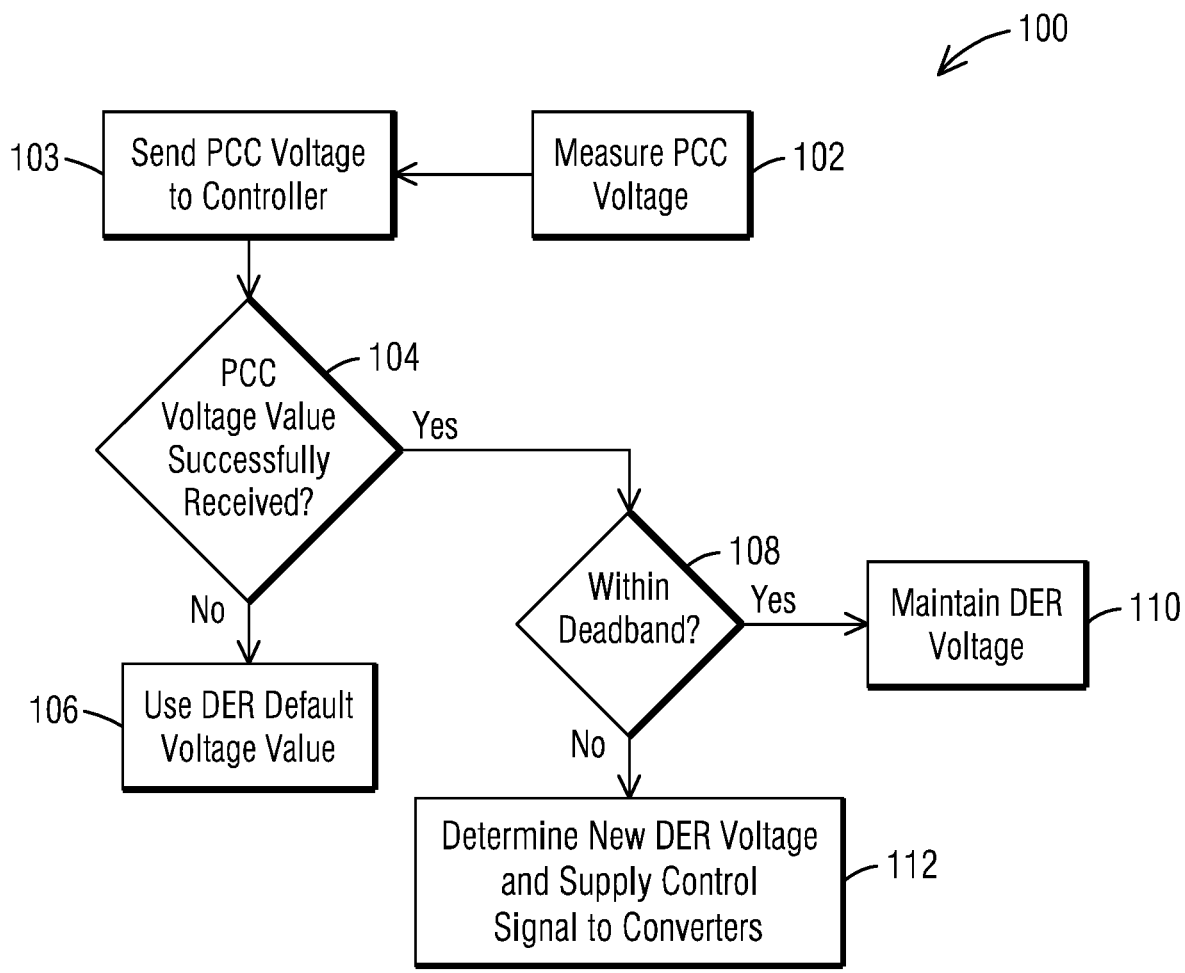
FIG. 4 illustrates a software flowchart for use with the present invention.

One such software algorithm 100 is depicted in FIG. 4. At a step 102 the PCC voltage is measured (and in one embodiment converted to a pu voltage value).

At a step 103 the measured voltage value is sent to the controller 39, 41 of FIG. 1. A decision step 104 determines whether the measured voltage value has been supplied to the controller 39, 41. For example, a loss of communications between the PCC and the DER will prevent the controller 39, 41 from receiving this measured voltage value.

A negative response from the decision step 104 executes a step 106 where Vder is set to a predetermined default value, such as the most recent good value or a specific default voltage value. This default value of Vder is maintained until communications has been re-established and a measured voltage value at the PCC is sent to the controller 39, 41.

An affirmative response from the decision step 104 executes to a decision step 108 for determining whether the measured PCC voltage value is within the dead band 66 of FIG. 2.

An affirmative decision maintains the current DER output voltage as indicated at a step 110.

A negative decision requires determining a new DER voltage (as indicated at a step 112) and supplying a control signal indicative of that DER voltage to the network-side converters 29, 31 of FIG. 1. As described herein, the new DER voltage can be determined as an equation linking the measured value to the terminal voltage function of the measured PCC voltage (i.e., Vder=f(Vpcc)) or can be determined from a schedule of Vder and Vpcc values. One such functional relationship is depicted in FIG. 2. Of course whatever the functional relationship, the DER voltage cannot exceed upper and lower limits on that voltage as established according to the physical and electrical limitations of the DER.

The inventors suggest that the inventive technique of the present invention will be favored by DER equipment vendors and operators and by some electrical power system operators. It is clearly preferable for equipment vendors since the equipment does not need to measure the reactive power and exercise control over the reactive power absorbed or injected by the DER. For example, the amount of reactive power delivered to a load from a DER to a remote point (with a complex voltage Vr) over an impedance element (electrical power conductor) with a complex impedance of Z (=R+jX) requires knowledge of the phase relationship between the DER voltage and the remote point and the exercise of complex arithmetic calculations. Use of a DER output voltage functional relationship or an output voltage schedule, according to the present invention, is relatively simple and less likely to lead to misinterpretation due to the ambiguous characterization of reactive power as "leading", "lagging", "under excited", "over excited", "capacitive", "inductive", etc.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for controlling distributed energy resources supplying electrical power to a power system through a point of common coupling, the method comprising:
    controlling an output voltage of at least one of the distributed energy resources to vary inversely with a power system voltage measured at the point of common coupling without consideration of reactive power; and
    controlling the output voltage of the at least one of the distributed energy resources in accordance with an established relationship between the voltage measured at the point of common coupling and the controlled output voltage;
    wherein the relationship comprises a low voltage region and a high voltage region separated by a dead band region; and wherein the relationship is an inverse relationship in the high voltage region and in the low voltage region, but the controlled output voltage does not vary with a varying voltage measured at the point of common coupling in the dead band region.

2. The method of claim 1, wherein the inverse relationships in the low voltage and high voltage regions are linear.

3. The method of claim 1, further comprising:
controlling the output voltage of the at least one of the distributed energy resources in accordance with an established relationship between the voltage measured at the point of common coupling and the controlled output voltage; and wherein the relationship is not symmetrical between a high voltage region and a low voltage region of the relationship.

4. The method of claim 3, further comprising:
the relationship comprising a more robust response in the low voltage region than in the high voltage region.

5. The method of claim 1, further comprising:
controlling the output voltage of at least two of the distributed energy resources in accordance with a respective relationship between the voltage measured at the point of common coupling and a respective controlled output voltage for the respective distributed energy resource, wherein the relationship is different for the at least two distributed energy resources.

6. The method of claim 1, further comprising:
establishing a relationship between the voltage measured at the point of common coupling and the controlled output voltage; and
controlling the output voltage of the at least one of the distributed energy resources in accordance with the relationship; wherein the relationship is at least one of the group of linear, stepped, table based, schedule based, and embodied in a mathematical relationship.

7. A system for regulating a voltage at a point of common coupling connected to an electrical power grid, wherein a distributed energy resource farm supplies the voltage to the point of common coupling, the distributed energy resource farm comprising a plurality of connected distributed energy resources each supplying a terminal voltage, the system comprising:
a voltage determining device providing an output responsive to a power system PCC voltage at the point of common coupling; and
a control device operatively connected to the voltage determining device and controlling a terminal voltage of an associated distributed energy resource in the farm to vary inversely responsive to the PCC voltage without consideration of reactive power;
wherein the control device is adapted to control the distributed energy resources according to the method of claim 1.

8. The system of claim 7,
wherein the control device comprises a table of terminal voltages indexed to the PCC voltage; or
wherein the control device comprises an equation relating the PCC voltage and the terminal voltage.

9. The system of claim 7, wherein the control device comprises a relationship between PCC voltage and terminal voltage, the relationship comprising a low voltage region and a high voltage region.

10. The system of claim 9, wherein the high voltage region and the low voltage region are separated by a dead band region within which a value of terminal voltage does not vary with a varying PCC voltage.

11. The system of claim 9,
wherein the relationship is linear in at least one of the high voltage region and the low voltage region; or
wherein the relationship is not symmetric between the high voltage region and the low voltage region; or
wherein the relationship is more robust in the low voltage region than in the high voltage region.

12. The system of claim 7, further comprising:
each of at least two of the distributed energy resources being controlled responsive to the PCC voltage without consideration of reactive power in accordance with a respective relationship between the PCC voltage and a respective terminal voltage for the respective distributed energy resource, wherein the relationship is different for the at least two of the distributed energy resources.

13. A system for regulating a voltage at a point of common coupling connected to an electrical power grid, wherein a distributed energy resource farm supplies the voltage to the point of common coupling, the distributed energy resource farm comprising a plurality of connected distributed energy resources each supplying a terminal voltage, the system comprising:
a potential transformer connected at the point of common coupling and providing a PCC voltage output;
a controller receiving the PCC voltage output and providing a terminal voltage control signal responsive to a predetermined inverse relationship between PCC voltage output and the terminal voltage over a first range of PCC voltage outputs and no variation in the terminal voltage over a second range of PCC voltage outputs, without consideration of reactive power; and
a converter controlling a terminal voltage of at least one of the distributed energy resources responsive to the terminal voltage control signal.

14. The system of claim 13, wherein:
the first range of PCC voltage outputs comprises a low voltage region and a high voltage region and the second range of PCC voltage outputs comprises a dead band region between the low voltage region and the high voltage region.

15. The system of claim 14, wherein the high voltage region and the low voltage region are not symmetrical about the dead band region.

16. The system of claim 14, wherein the PCC voltage and terminal voltage vary inversely in both the high voltage region and the low voltage region.

* * * * *